US008024369B2

(12) United States Patent
Pellegrini et al.

(10) Patent No.: US 8,024,369 B2
(45) Date of Patent: Sep. 20, 2011

(54) SYSTEM AND METHOD FOR AUTOMATING ETL APPLICATION

(75) Inventors: Paolo Pellegrini, Rome (IT); Antonio Grasso, Lecce (IT)

(73) Assignee: Accenture Global Services Limited, Dublin (IE)

( * ) Notice: Subject to any disclaimer, the term of this patent is extended or adjusted under 35 U.S.C. 154(b) by 442 days.

(21) Appl. No.: 12/057,958

(22) Filed: Mar. 28, 2008

(65) Prior Publication Data

US 2009/0177671 A1    Jul. 9, 2009

(30) Foreign Application Priority Data

Jan. 3, 2008  (EP) .................................... 08425005

(51) Int. Cl.
*G06F 17/30*    (2006.01)

(52) U.S. Cl. ....................... 707/802; 707/758

(58) Field of Classification Search .................. 707/688, 707/690, 703, 706, 707, 758, 769, 791, 802, 707/812; 399/82, 85, 87
See application file for complete search history.

(56) References Cited

U.S. PATENT DOCUMENTS

| 6,047,260 | A | 4/2000 | Levinson | |
|---|---|---|---|---|
| 7,107,283 | B2 * | 9/2006 | Seifi | .............................. 707/797 |
| 7,299,216 | B1 | 11/2007 | Liang et al. | |
| 7,499,867 | B2 * | 3/2009 | Lahey et al. | ....................... 705/7 |
| 7,664,419 | B2 * | 2/2010 | Matoba | ............................. 399/80 |
| 2004/0252322 | A1 * | 12/2004 | Gassho et al. | ............... 358/1.14 |
| 2005/0228711 | A1 * | 10/2005 | Lahey et al. | ....................... 705/9 |
| 2006/0190943 | A1 | 8/2006 | Haeri | |
| 2006/0195508 | A1 * | 8/2006 | Bernardin et al. | ............ 709/203 |
| 2006/0218551 | A1 | 9/2006 | Berstis et al. | |
| 2007/0136117 | A1 * | 6/2007 | Matsueda | ......................... 705/7 |
| 2007/0136324 | A1 | 6/2007 | Xu et al. | |
| 2007/0268512 | A1 * | 11/2007 | Sakakibara | ................... 358/1.14 |
| 2008/0313345 | A1 * | 12/2008 | Bernardin et al. | ............ 709/235 |

FOREIGN PATENT DOCUMENTS

CN    101063947    10/2007

OTHER PUBLICATIONS

Extended European Search Report for Application No. 08425005.9 dated Aug. 18, 2008 (7 pages).
Canadian Office Action for Application No. 2,648,210 dated Oct. 7, 2010 (6 pages).
Chinese Patent Office, Office Action in co-pending China applicaton Serial No. 200910001314.2 mailed Jun. 24, 2011 (12 pages).

* cited by examiner

*Primary Examiner* — Cam-Linh Nguyen
(74) *Attorney, Agent, or Firm* — Fish & Richardson P.C.

(57) ABSTRACT

Novel tools for development and operation of ETL (Extract Transform Load) systems for populating databases. An embodiment uses metadata tables to describe relationships between jobs to run for processing data. These relationships can include parent-child job relation, and priority. These tools create a DataStage Service Architecture (DSA) that helps automate and control the ETL process. Other tools allow developers to easily view and update the ETL process.

20 Claims, 9 Drawing Sheets

[See Fig. 6B]

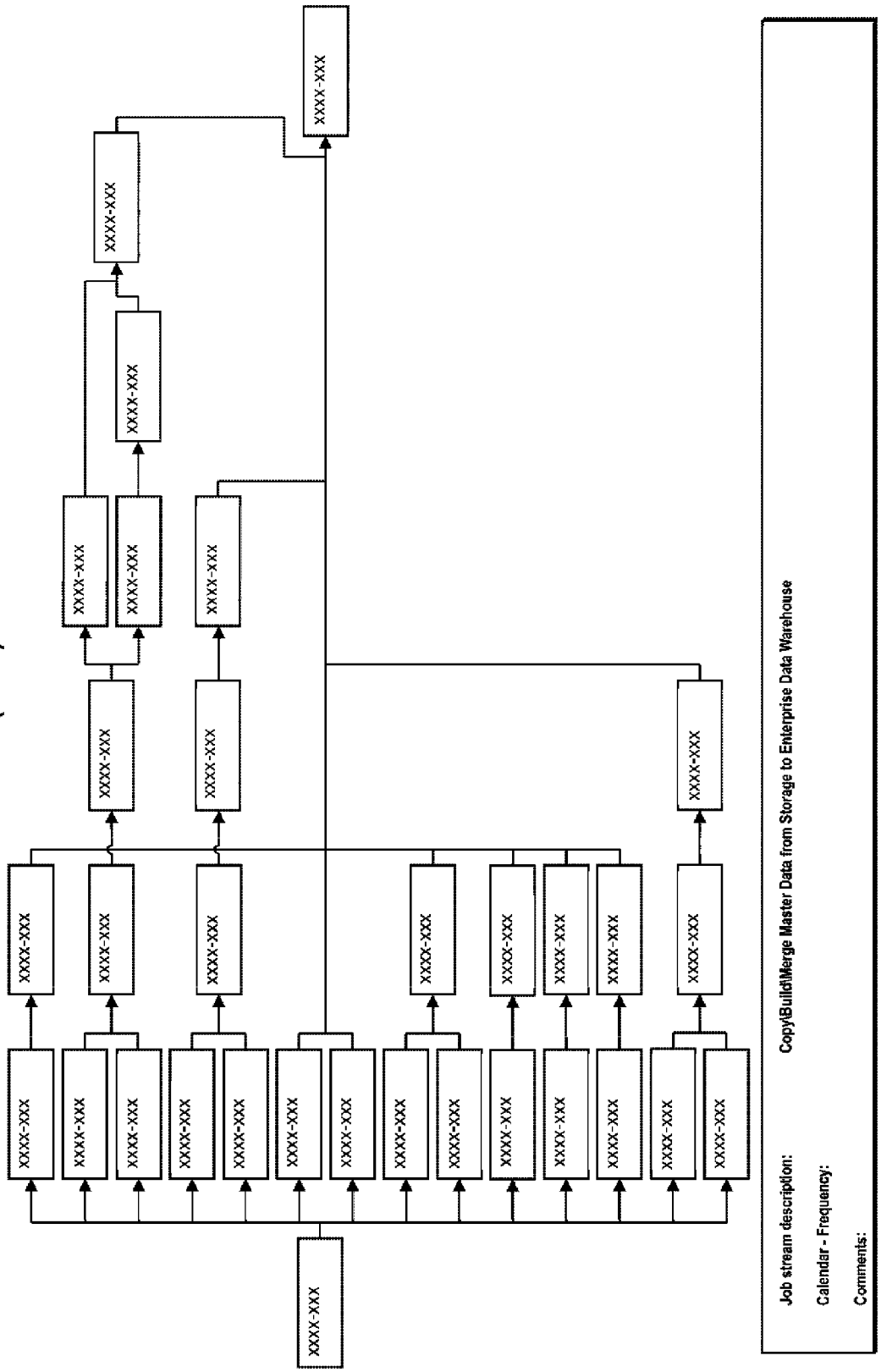

SYSTEM AND METHOD FOR AUTOMATING ETL APPLICATION

FIELD OF THE INVENTION

The invention relates generally to data processing, and more specifically, to automating the management of ETL (Extract Transform Load) processes for populating databases.

BACKGROUND OF THE INVENTION

ETL is a general tem used to describe a process in data warehousing (or populating databases) that involves extracting data from sources, transforming it to fit the business needs, and ultimately loading it into the database.

The first part of an ETL process is to extract the data from the source systems. Many database populating projects consolidate data from many different sources. Each separate source may also use a different data organization structure and/or format. Such data sources may include relational databases and flat files, but may also include non-relational database structures. The extraction step extracts and parses the data into a format for the transform process.

The transform process typically applies rules and/or functions to the extracted data, to prepare the data to be loaded. The requirements for the transformation process are a function of the extracted data and the ultimate form of the data for the database. Such transformation rules and functions include selecting certain fields, translating coded symbols, encoding new symbols, calculating values, merging sources, etc.

The load process loads the transformed data into the database. Depending on the requirements of the organization, this process ranges widely. Some databases merely overwrite old information with new data. More complex systems can maintain a history and audit trail of all changes to the database.

An ETL process can be very complex, with significant operational problems. One such problem is scalability. By its nature, the ETL process may be performed periodically, with increasing amounts of data and data sources to process. Further, the transformation rules and functions may be continuously modified to handle data differently based on the changing needs of the business.

Another problem with running an ETL process is that it can require a significant amount of processing time, and can easily involve errors and other unforeseen conditions that can halt the process. Typically, a process stage can not be restarted, but must be run again from the beginning. This can significantly lengthen the time to perform the complete ETL process.

Still another problem with the ETL process is that it requires a large amount of effort to design and build the ETL system for a particular domain. A mid-range data warehouse project can have 200-300 separate jobs. There are few automation tools or techniques to assist the developers, who must design, build, run, and maintain such a complex system.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below An embodiment of the invention is referred to as "DataStage Service Architecture" and exists on top of IBM DataStage ETL tool. This embodiment of the present invention provides several advantages against traditional Datastage orchestration techniques. It may minimize workflow execution time, for example by optimizing CPU usage by starting an ETL job as soon as all the prerequisite jobs are finished and a job slot is available. Similarly, an embodiment automatically manages the restart activities, in that it will block the execution of all child jobs of an aborted job to prevent inconsistency. Once restarted, the embodiment completes only the jobs pending from the previous execution.

An embodiment allows all configurations to be defined and updated by using technical tables; as an example, the adding or the removing of a job within a workflow is just a matter of inserting/deleting a value in a table.

An embodiment of the present invention allows an existing ETL project to be migrated into the new architecture.

Advantages of embodiments of the present invention include reduced effort for designing, building and testing ETL systems. Depending on the proportion of architecture components and job templates used and the degree of customization applied, several person-months of architecture development can be saved on a new project. Compared to a scenario where no common guidelines, templates, architecture, or services are used across ETL jobs, an estimate is that using the invention may save 40-50% of total ETL development effort.

Other advantages include:
  Decreased time to market, using a pre-built architecture layer which is typically on the critical path of ETL development.
  Decreased development risk and increased software quality through proven, comprehensive, and pre-tested framework and service components.
  Increased flexibility by isolating ETL management services as much as possible from the ETL job design, avoiding rigid execution schemas such as vertical or horizontal banded ETL.
  Increased maintainability through modular and standardized architecture with shared components, as well as through enforced and standardized production of technical metadata and software documentation.
  Improved operability through standard and comprehensive operations components.

An embodiment of the present invention includes a system for processing a plurality of ETL jobs with a job table including a plurality of job identifiers, each job identifier identifying a job to run, wherein the job table further includes information regarding which jobs to complete before running other jobs. It may also include a priority table including priority information for at least one job identifier in the job table, wherein if a job completes and a plurality of jobs may now run, the system utilizes priority information in the priority table to determine one of the plurality of jobs to run. It may also include a status table including information about which jobs have run, and information regarding a status result of each such job. The system may be stopped before all jobs have completed, whereupon restart, jobs that have not completed will be run. If a job has run and the status table indicates the job has completed, then the job will not be run again. The system may limit a number of jobs that may run at one time to a predetermined value.

The information regarding which jobs to complete before running other jobs may be in the form of a parent/child indication between a first job identifier and a second job identifier.

Another embodiment includes a display interface to generate a display of real time information regarding the plurality of ETL jobs, for example identifying which jobs have completed.

Another embodiment of the present invention includes an integration component, such as a workflow designer, to extract information from an application regarding the plurality of ETL jobs, and insert the information into the job table(s). Also, an embodiment may include a diagram generator, that extracts information from the job table and generate a diagram of jobs, the diagram including an indication of which jobs must run before other jobs. The diagram generator may use Visio® macros to generate the diagram in Visio.

The present invention may also include a method for processing a plurality of ETL jobs, which may be performed by a Workflow manager. This method may include determining from a job table a plurality of jobs to run, wherein the job table further includes information regarding which jobs to complete before running other jobs; determining from a status table a status for the plurality of jobs to run, wherein the status table includes an indication of which jobs have completed successfully and which jobs need to be run again; determining a subset of jobs to run based on the information from the job table and the status table. The subset of jobs to run may be kept below a predetermined value. The method also includes commencing processing the subset of jobs; and if a job in the subset of jobs completes, determining another job to run, wherein the determination includes utilizing job priority information if a plurality of jobs may now run. It also includes updating the status table based on processing of the plurality of jobs. If the processing is stopped before all jobs are completed, upon again commencing processing of the plurality of jobs, completed jobs will not be run again.

The step of determining a subset of jobs to run includes determining which jobs have been completed based on the indication from the status table.

The method may also include generating a display of real time information regarding the plurality of jobs, wherein a status of each of the plurality of jobs is displayed. Such status may include identifying whether a job has completed.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 8 illustrates a sample output of diagramming tool according to an embodiment.

DETAILED DESCRIPTION OF THE INVENTION

Figure 1:
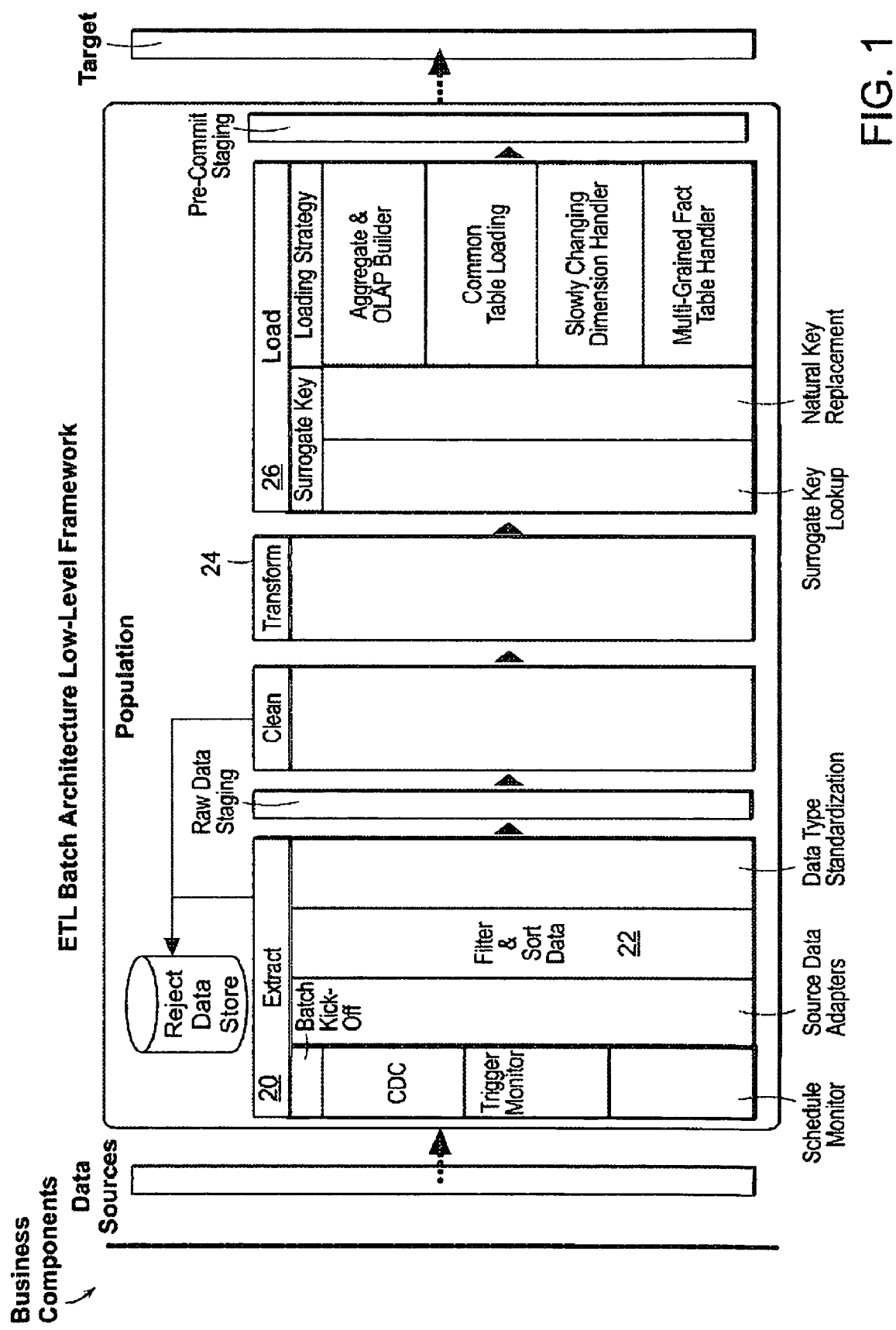
FIG. 1 illustrates an overview of a business components layer of an embodiment of the present invention.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

An embodiment, referred to as DataStage Service Architecture (DSA), provides a complete and robust data-loading environment for different types of ETL applications (e.g. Data Warehousing, Data Integration, Data Migration, etc.) involving simple or complex data loading operations. DataStage Service Architecture is part of broader ETL accelerator suite of assets that also includes the ETL Accelerator framework described in more detail below. The ETL accelerator suite of assets according to one aspect of the invention aims to provide a jumpstart for the design and build of ETL applications, which are typically used for Data Warehouse population, Data Integration, Master Data Synchronization, or other bulk data migrations. The accelerator design works on proven strategies, principles, best practices, and components developed and used in real production environments.

Data loading in ETL projects involves business transformations and the use of common services. Business transformations are the combination of elementary tasks like: Extract (select), Sort/Filter (order, group, where), Transform (the "true business logic"), and Load (insert or update). The common services are operations to manage architecture tasks like: scheduling, parameterization, restart & SLA management, audit logging, etc. An embodiment of the invention is focused on providing an execution environment for these common services.

Programming and maintenance of the ETL software can be a complex operation. To support the business component an embodiment of the present invention includes a group of service components specialized in common tasks related to the ETL orchestration. These component may be platform-dependent but business-aware so they are highly reusable. A great advantage of using a proven framework with pre-built and tested service components is that a developer can reduce the design & build efforts while obtaining better software quality. Typically a savings of around 40-50% of the total ETL development effort can be achieved. An embodiment is helpful to set standard design guidelines improving overall software quality and also force the production of technical metadata that can help the developer's work and reduce the effort of documenting the software.

An overview of ETL Accelerator Framework according to an embodiment will now be provided. The ETL Accelerator Framework comprises 3 layers: business components, metadata/semantic, and services. The services and metadata layer diagrams are a foundation shared with the Accenture Delivery Architecture Business Intelligence Application Style and the Accenture Delivery Methods for Business Intelligence, provided by Accenture Inc.

The business components layer for an ETL framework is shown in FIG. 1. It contains the core business logic. A high level view of the components include the Extract (select) task 22, Sort/Filter (order, group, where) task 22, Transform (which includes the utilization of business logic) task 24, and Load (insert or update) task 26

Figure 2:
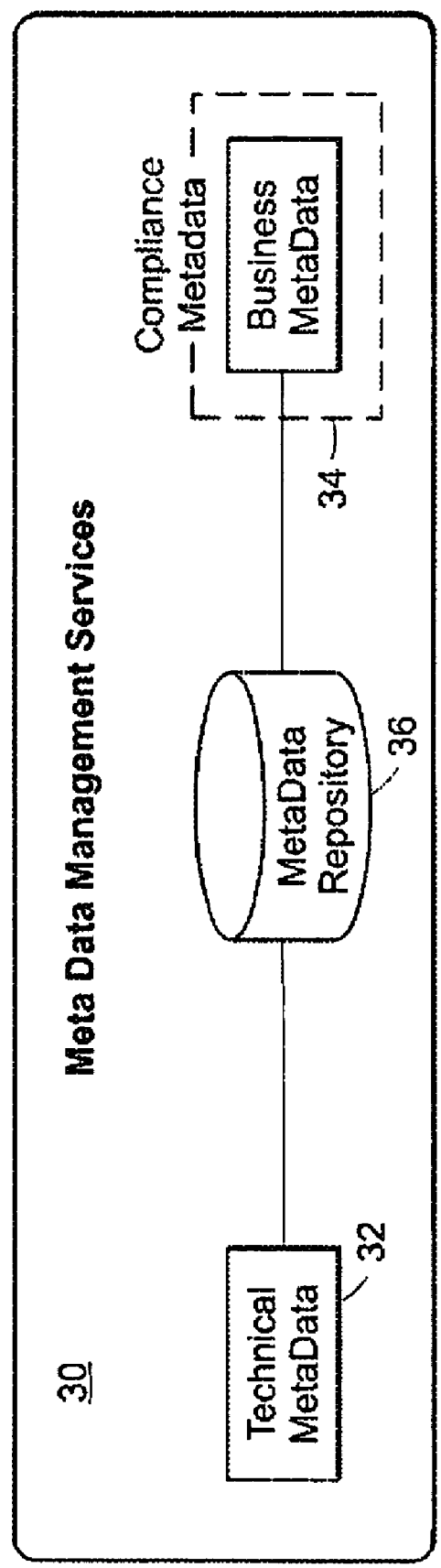
FIG. 2 illustrates an overview of a metadata/semantic layer of an embodiment of the present invention.

The metadata layer, FIG. 2, may include a set of tables 32-34 to hold common definitions, manage common tasks, as well as the primary tool to manage the software configuration and documentation. In many cases a metadata repository 36 is provided by the ETL tool and also provides functions such as data lineage or impact analysis. Metadata can be imported from an existing environment. Further, metadata can be used to produce documentation of the current ETL application using the tools provided.

Figure 3:
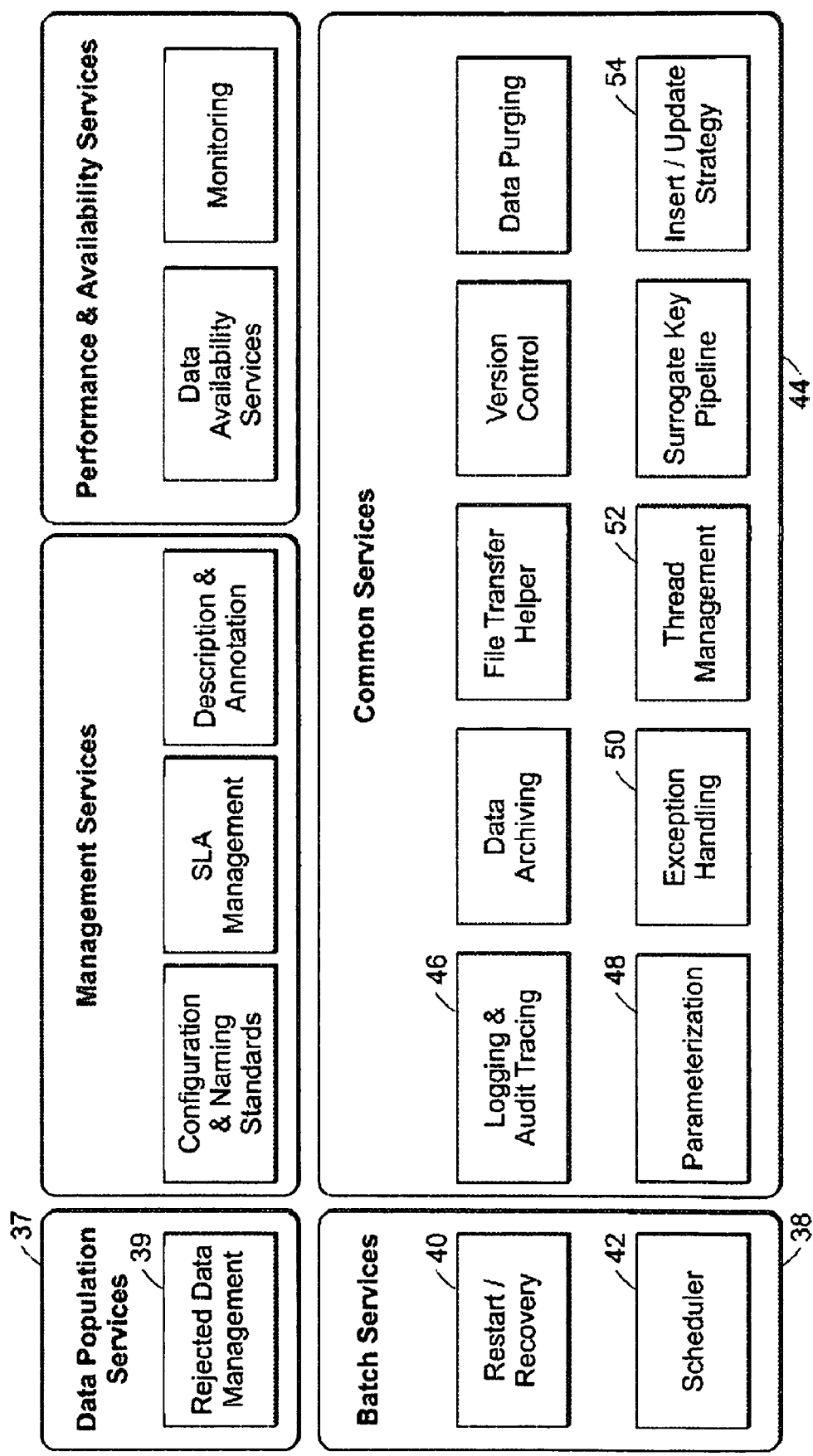
FIG. 3 illustrates an overview of a services layer of an embodiment.

The service components, FIG. 3, support the business layer for common tasks related to the ETL orchestration. They are typically platform-dependent but business-aware, thus highly reusable. Normally in a common ETL architecture most of the control and management logic is tied together with the business logic and these are both contained in a data flow component (in DataStage this is called a job). In the approach for the present embodiment, the business logic is separated from the control and management logic, so in the DataStage job one typically puts only the business logic. This approach enables the reuse of the control and management components across multiple implementations, without re-architecting these components. For a DataStage solution, certain components such as the data population services 37 and batch services 38 are enabled by the DataStage architecture of an embodiment of the present invention. By their nature, these services 37, 38 may be stopped and re-started as processing is performed to populate the databases.

A reject data management service 39 handles invalid data that needs to be rejected at some point during the load so that the remaining data can continue and the process can complete at some point. Reject data management is critical to let the process continue to run despite bad or malformed data. The rejected records are stored in a data container to enable further inspection and resolution of the issues causing the rejections.

A scheduler 42 may initiate the ETL process either based on schedule, event, or change data capture notice. This service is often provided either by a production-support team or through an ETL tool. The ETL tool has the advantage of tight integration with the ETL run-time environment.

Another batch service is restart/recovery 40, which according to an embodiment allows for graceful recoveries after a failure, and will prepare the database and ETL server for restart, as described below.

Other components, grouped as common services 44, are typically only run once. Such services may include logging & audit tracing 46. Robust logging and tracing services are helpful throughout the ETL process so that application activity and data manipulation results can be exposed to the users. Parameterization services 48 include a parameter managing service to help create a robust ETL solution. ETL jobs may be designed to accept parameter values from the scheduler rather than hard coding them. The exception handling service 50 is helpful for proper ETL execution and monitoring. Whenever an unexpected event or invalid data is found during ETL, execution the event is typically recorded. Other components 44 may include thread management services 52, which help the embodiment split execution runs in multiple parallel processes.

An embodiment of the present invention helps implement the DataStage Service Architecture (DSA), which provides a complete and robust data-loading environment for different types of ETL projects involving simple or complex data loading operations. This DSA helps implement part of the Service Components indicated in FIG. 3. The DSA also simplifies ETL programming and maintenance by standardizing ETL job design, handling basic ETL functions such as scheduling, parameterization and restart management, and facilitating IT operations for ETL streams.

Figure 4:
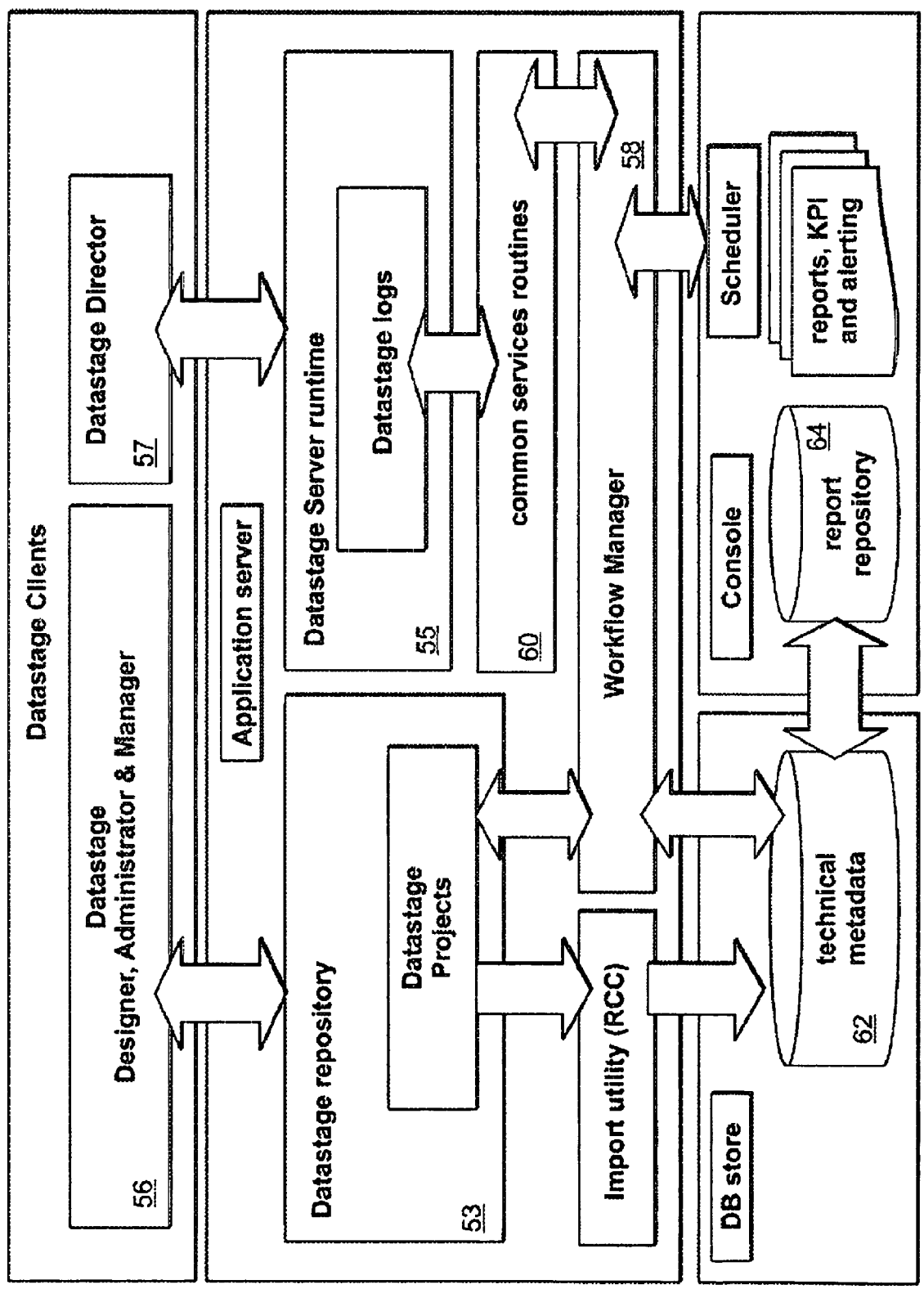
FIG. 4 illustrates several components forming an embodiment referred to as "DataStage Service Architecture", as related to a Datastage ETL tool component.

The DataStage Service Architecture may be implemented on top of IBM DataStage® ETL tool. As shown in FIG. 4, the DataStage ETL tool suite is composed of several components that can be classified as Server components and Client components.

DataStage Server Components include:
a. The DataStage Repository 53, a central store that contains all the information required to build a data mart or data warehouse. Typically the Repository 53 is stored in a proprietary layout and is not easily accessible by third-party tools. Alternatively there are some DataStage BASIC functions used to access characteristics of a particular DataStage project and extract technical Meta data. These BASIC functions are those used by the present embodiment.
b. The DataStage Server 55, which runs executable jobs that extract, transform, and load data into a data warehouse.

DataStage Client components include:
a. The DataStage Designer 56, a design interface used to create DataStage applications (known as jobs). Each job specifies the data sources, the transforms required, and the destination of the data. Jobs are compiled to create executables that are scheduled by the Director and run by the Server (mainframe jobs are transferred and run on the mainframe);
b. The DataStage Director 57, a user interface used to validate, schedule, run, and monitor DataStage server jobs;
c. The DataStage Manager 56, a user interface used to view and edit the contents of the Repository 53;
d. The DataStage Administrator 56, a user interface used to perform administration tasks The Workflow Manager 58 is a DataStage control job that controls and manages most of Architecture capabilities for this embodiment. DataStage custom routines 60 help to manage common tasks (such as auditing, error handling). Technical metadata tables 62 are used to configure the architecture. Also, auditing reports 64 are used to monitor ETL execution. Each of these components will be discussed further below.

In one embodiment, the Workflow Manager 58 implements a majority of the ETL services. These include determining the execution order of the ETL procedures 42, FIG. 3; restart/recovery for ETL procedures that failed in a previous session 40; and auditing ETL procedure events and activity (messages/error/records processed) 46. Other such services may include managing exception handling 50; retrieving ETL procedure parameters 48; and tracking workflow execution 46 (and also Monitoring but this box has not been numbered)

In this embodiment, the Workflow Manager 58 uses a set of technical metadata tables 62 to configure the behavior of the above-described services. Local and Global execution parameters such as maximum number of running ETL Jobs, maximum number of warning allowed, SLA threshold, are set depending on the characteristics and size of the project and on the target environment. The technical metadata tables 62 will be described in further detail below.

The DSA allows ETL procedure development to be divided and distributed to many programmers that follow only few design guidelines. Examples include configuring ETL jobs that are designed to receive a set of external parameters from the scheduler 42; and also configuring ETL jobs that are as atomic as possible in order to allow restart & recovery procedures.

Figure 5:
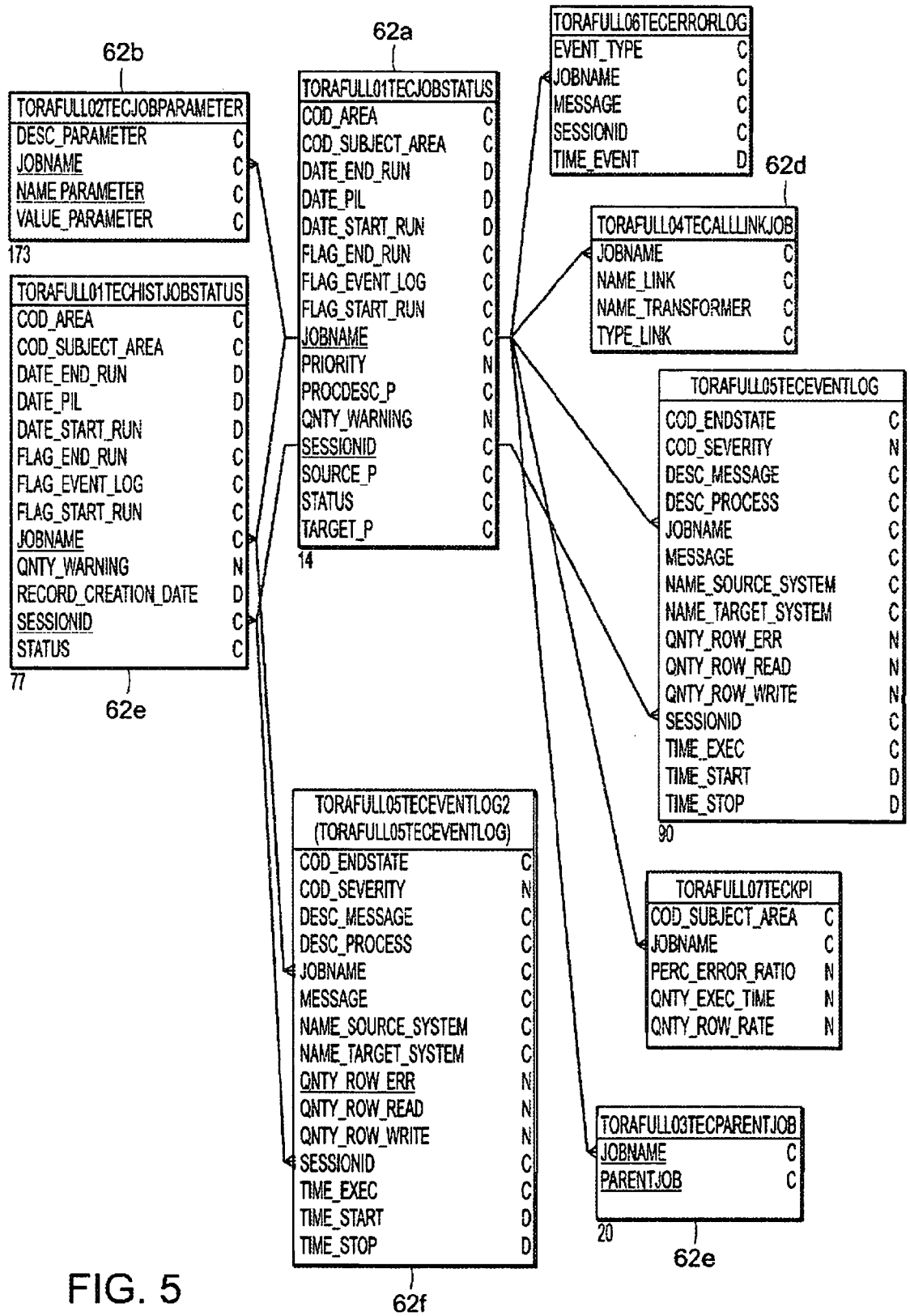
FIG. 5 illustrates metadata tables according to one embodiment of the present invention.

A representation of the logical data model of the technical metadata tables 62 is shown in FIG. 5. As previously described, these tables include parameters and values for jobs to be performed by the Workflow Manager 58. In this embodiment, the tables 62 are populated by data using programming tools (as described below) or by data imported from ETL projects that do not utilize the DataStage Service Architecture (also described below).

For this embodiment, certain fundamental tables are maintained and utilized for each job. The TORAFULL01TECJOBSTATUS table 62a is the Job Master Data table and contains information for each job about the source system, subject area, warning level, and information about the job's latest run status including when execution started and status at completion. This information about the last execution run is updated at every run and is used to manage the restart and recovery activities. This table also include a priority level for each job. The priority is useful for selecting an order for which job(s) to run first when multiple jobs are ready to be run at the same time. An example of this is when a parent job finishes, multiple child jobs that depend on the parent job finishing may become eligible to run. Different child jobs may have different running requirements (for example time to run, processor load, etc.) If these child jobs are all started simultaneously, or a subset chosen randomly, the process may be unstable or slow. By providing a priority for one or more child jobs, the embodiment may select and run child jobs in an efficient manner. The parent-child relationship is maintained in the TORAFULL03TECPARENTJOB table 62c The TORAFULL02TECJOBPARAMETER table 62b contains the list and the values of all the local parameters used by each job during execution. The information in this table is typically read-only at runtime, but in exception cases, a job can be enabled to modify some values, however, typically this modification practice is not recommended The TORAFULL03TECPARENTJOB table 62c records what the parent job are for each dependent or child job. A parent job is a job that must complete before the child job can start. A job can have multiple parents, so all parent jobs should finish before starting a child job. Each parent job can have one or more child jobs. This table is read-only at runtime. This parent-child setup defines what order the jobs may be run in, with the parent jobs preceding the child jobs. When there is more than one child job, the priority level value contained in the table TORAFULL01TECJOBSTATUS table 62a will decide which job will start first.

The TORAFULL04TECALLLINKJOB table 62d contains the names of all the data links and transformers contained in each job. This table is read only at runtime and it is used by the DSA auditing procedures. A data link can be tagged as Input/Output/Error link depending on the position in the data flow logic. The DSA auditing procedures extract the number of rows processed for each links and aggregates this data according to the Input/Output/Error classification to provide meaningful execution statistics.

Other tables may be created or populated during a job. For example, the TORAFULL01TECHHISTORYJOBSTATUS table 62e contains the history of all job execution statistics for the entire workflow session. The TORAFULL05TECHEVENTLOG table 62f includes runtime error information, which allows the embodiment to process and analyze the cause that generates the error, and restart the job once the error is corrected The TORAFULL07TECKPI table 62g contain the threshold value for the proposed JOB and AREA KPI to support SLA management. This table is optional and we do not need to use it for normal operations. It is useful when a user wants to enhance the reporting and monitoring capabilities of the DSA, especially when a job reads data from an external source systems or when a job must finish within a particular time window.

The Workflow Manager 58 typically uses SQL (Structured Query Language) to access the tables 62. When the Workflow Manager 58 starts to process the workflow, a new session identifier value is generated and stored in the SESSIONID field.

Figure 6A:
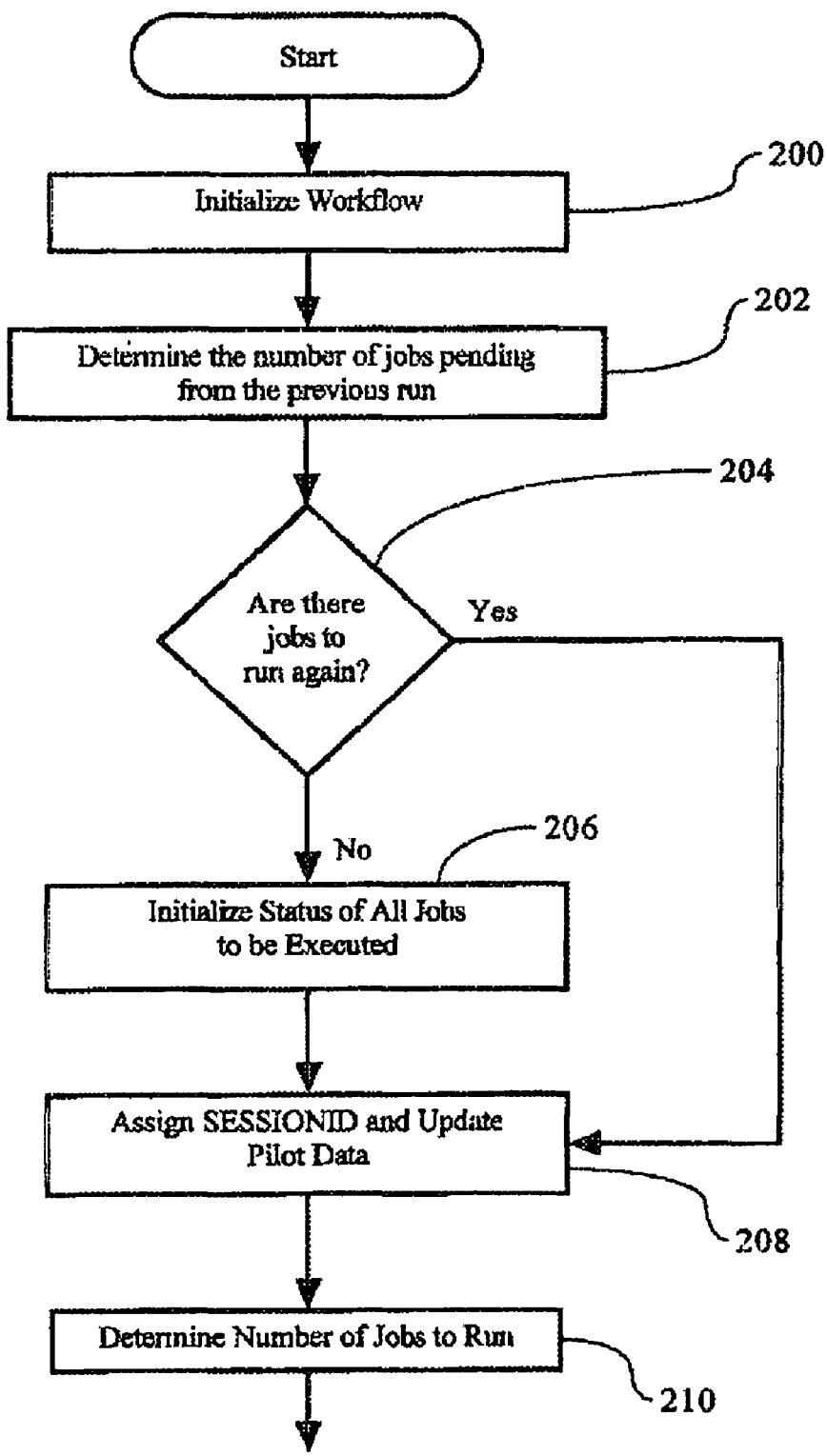
FIGS. 6A and B illustrates a flow chart of the application logic performed by the Workflow Manager.
Figure 6B:
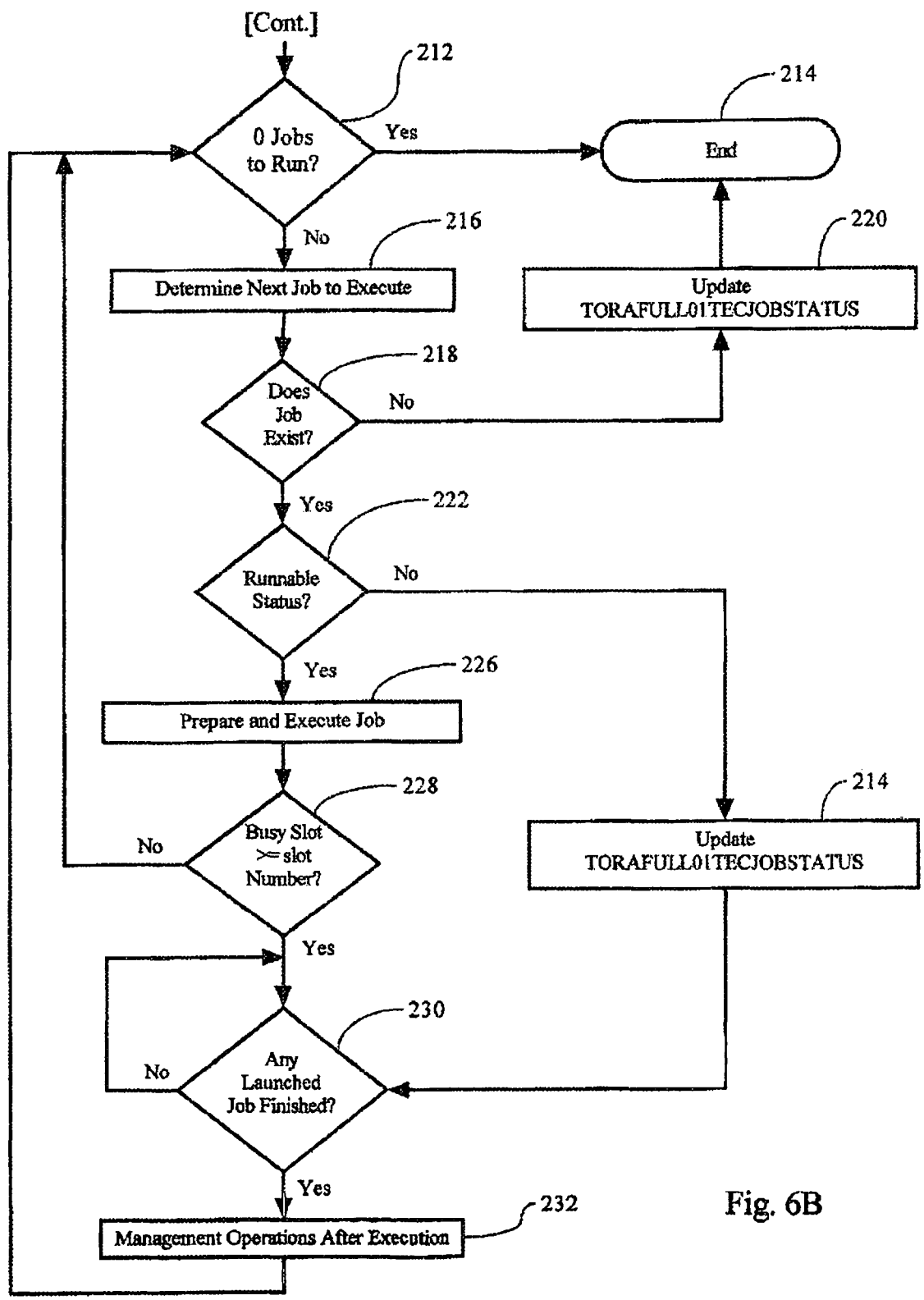

An embodiment of the Workflow Manager processes jobs as set out in FIG. 6. As previously described, the present invention as set forth in this embodiment allows ETL jobs to be processed in a manner that allows prioritization, restarts and recovery, and the ability to audit jobs during and after running. As such, the Workflow Manager performs job execution and monitoring in accordance with the steps as set forth in FIG. 6.

The Workflow Manager 58 initializes the workflow, step 200, and then determines the number of jobs pending from previous runs, step 202. Typically pending job are those that have not been executed due to error condition on the job itself or in the parent job.

At step 204, the Workflow Manager determines if there are jobs to be run again. These are jobs that were previously started, but did not complete, typically because of errors or priority problems. If there are such jobs, the Workflow Manager updates the SESSIONID field in the metadata tables 62 FIG. 5, and updates the pilot data. The pilot data is a datetime value managed globally by the Workflow manager, it can be used by each job to manage incremental loads, step 208.

If there are not jobs to be run again, but there are new jobs to commence, the Workflow Manager initializes the status of all such jobs, step 206. Next, the SESSIONID field and pilot data are updated, step 208. The Workflow Manager then determines the number of jobs to run, step 210. Information about limits on numbers of jobs to run will be described below.

At this point, the Workflow Manager commences a loop to allow job processing in accordance with an embodiment. If there are no jobs to run, step 212, then the process is done, and the process ends, step 214. However, if there are jobs to run, the process continues. The Workflow Manager determines the next job to execute, based on the parent-child relationship and priority values, step 216. Once the next job is selected, the Workflow Manager checks whether the job exists in the repository. This is necessary to avoid Workflow Manager failure, because a job can be listed in the technical tables but could be absent from the DataStage repository or have a different name. In the case where the job does not exist, the STATUS field on the TORAFULL01TECJOBSTATUS table is updated step 220 and the process ends. All the other pending jobs will not be executed to avoid process inconsistency. This conservative behavior allows an operator to check and correct the workflow structure.

If at step 218 it is determined that an executable job exists, the next step 222 is to determine if this job has a runnable status (compiled). If not (job aborted or not compiled) the Workflow Manager stops the process executions, halting all the running jobs. Then as in the previous bullet the STATUS field in the TORAFULL01TECJOBSTATUS table for the affected job is updated, step 224. This update allows the operators to know what is happening in the process using the predefined reports.

At step 226, the Workflow Manager prepares the job and commences execution. In this embodiment, up to ten jobs may execute at one time, however the invention is not limited to any such number of jobs. The Workflow Manager keeps track of the number of jobs running, and if more slots to run jobs are available, step 228, the process goes back to step 212 to start up other pending jobs. Otherwise the process continues until a running job finishes, step 230, at which time the Workflow Manager performs post-execution operations, including the update of the job status fields in the TORAFULL01TECJOBSTATUS, recording of job execution information in the TORAFULL01TECHISTJOBSTATUS table and the recording of auditing information in the TORAFULL05TECEVENTLOG table step 232.

This process as described allows the Workflow Manager to process multiple jobs that have priorities and sequence requirements, as well as work with jobs that may be stopped and restarted multiple times as errors and other conditions are addressed.

An embodiment of the present invention includes a user console with a GUI that provides configuration and control over the process. This console allows users to gain access by providing a username and password. The user can then perform certain tasks including:

Job Search: to perform a search on ETL database for given job name.
Job Management: to configure, modify, delete a job and related attributes.
Kpi Search: to perform a search on ETL database for given Kpi name (KPI=Key Performance Indicator).
Kpi Management: to configure, modify, delete Kpi.
Add user: to add a new user.
Password management: to manage user's password.
Tools to enter data for and modify meta data tables 62.

Figure 7:
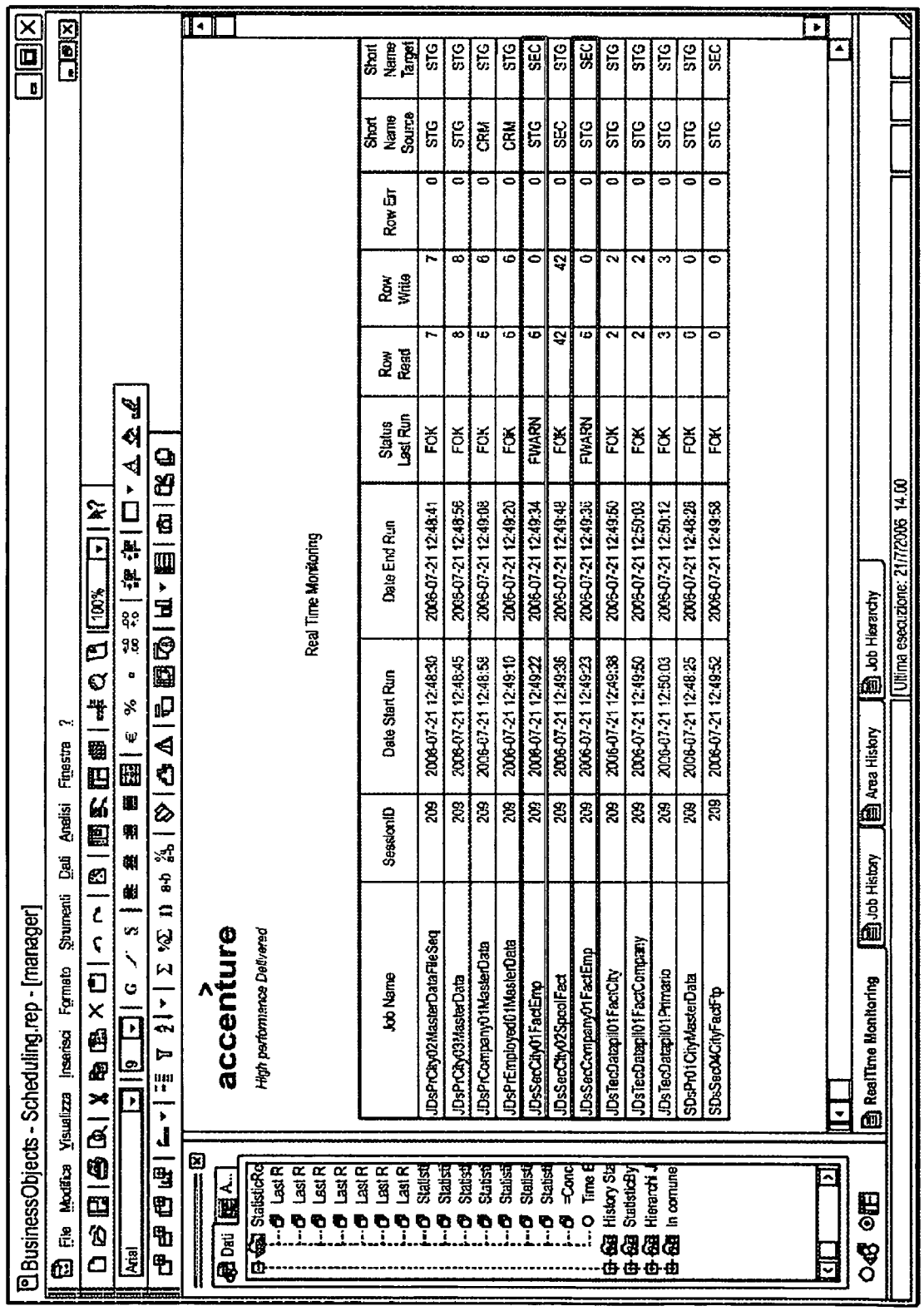
FIG. 7 illustrates a real time monitoring display according to an embodiment.

FIG. 7 illustrates a display provided by the console according to one embodiment. This display shows a predefined reporting table to allow real-time monitoring of current sessions. Information about the status of each job is presented, including start and end times, status of run, error counts, etc. Examples of other reports include execution trend reports and SLA monitoring at the session level, job level and subject area level.

A feature of another embodiment is shown in FIG. 8. This embodiment, called Workflow Designer, may generate a workflow diagram based on information automatically extracted from the metadata tables 62. The workflow diagram visually lays out the job procession ordering and dependency for a process, allowing a user to easily understand complicated job requirements and ordering. In this embodiment, the workflow diagram is created by extracting data from the metadata tables 62, and the diagram is automatically generated in Microsoft Visio® using macros. However, this workflow diagram may be created in a variety of different ways, and may be configured to provide more or less information. The Workflow designer uses SQL statements and temporary tables to generate a tabular representation of the workflow structure. The tool uses Microsoft Visio Object Model to draw each job as a box and connect the boxes according to the parent-child relationship. Within each box some useful information about the job is written, including the job name and the execution parameters. The Workflow designer can be considered an extension of the DSA because is based on the same technical tables that support the DSA.

Another embodiment of the present invention includes tools to help migrate and convert pre-existing DataStage ETL applications to an architecture based on the DataStage Service Architecture. A complex ETL integration project can have hundreds of jobs, thus the data entry can be non-trivial and error prone. A utility referred to as ReadCurrentConfiguration may read an existing architecture, and extract some information regarding job names, parameter names, and data links and transformers names within every job. Details for this information is inserted in the metadata tables, for example TORAFULL01TECJOBSTATUS 62a, TORAFULL02TECJOBPARAMETER 62b, TORAFULL03TECPARENTJOB 62c, and TORAFULL04TECALLLINKJOB 62d. Typically, the extracted information is not exhaustive for correct process execution and should be reviewed and completed manually, as indicated in the next point.

Once the metadata tables 62 are completely loaded, the population architecture may be designed. This may include categorizing jobs in subject areas, determining the parent-child relationship based on functional dependencies, and determine the importance of a job in terms of duration and in terms of number of child jobs.

The DataStage Service Architecture can be applied in any DataStage implementation and doesn't require a particular ETL job design approach. Typically the jobs should be designed to receive a set of external parameters from the scheduler. If existing jobs have their own parameter management, it is helpful to understand how to integrate this with the service architecture. Another useful general guideline is that ETL procedures should be designed to be as atomic as possible, in order to better manage restart & recovery processes. This can be accomplished in an embodiment by using frequent staging points. Based on the final population architecture and on the server size a maximum number of processes that can be executed in parallel can be determined and set.

One or more aspects of the invention may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A computer-implemented method comprising:
  selecting a plurality of candidate jobs to execute in a current job run, wherein the candidate jobs comprise pending jobs from a previous run that have not been completed due to an error condition and that are to be executed again, or new jobs in which execution has not yet been attempted, and wherein each candidate job performs an extracting, transforming or loading function for populating a database;
  storing, in a job status metadata table that stores information about each job's status when the previous run was completed in a STATUS field and that further stores information specifying a priority level for each job in a PRIORITY field, a new session identifier value in a SESSIONID field;

selecting a subset of the candidate jobs to execute in the current run;

selecting a first job of the subset of candidate jobs to execute based on parent job-child job relationship information stored for the first job in a parent job metadata table, and further based on the priority level stored for the first job in the job status metadata table;

determining that the first job does not actually exist within a particular repository or that the first job is not compiled; and based on determining that the first job does not exist within a particular repository or that the first job is not compiled, updating, by one or more computers, the STATUS field for the job in the job status metadata table to reflect that the job has not been completed due to an error condition, and halting execution of all remaining jobs in the subset.

2. The method of claim 1, further comprising determining the priority level for the first job from the PRIORITY field of the job status metadata table.

3. The method of claim 2, wherein selecting the first job comprises determining that the priority level for the first job has a highest priority level among multiple child jobs that have become eligible to execute in the current run based on a parent job successfully completing.

4. The method of claim 1 further comprising determining that two or more parent jobs of the first job have successfully completed.

5. The method of claim 4, wherein, in response to determining that the two or more parent jobs of the first job have successfully completed, selecting the first job further comprises determining, from the information stored for the first job in the parent job metadata table, that the first job is eligible to be executed.

6. The method of claim 1, further comprising determining, from one of the metadata tables, a quantity of candidate jobs to select in the subset.

7. The method of claim 6, further comprising selecting, as the subset, the determined quantity of candidate jobs.

8. A system comprising:

one or more computers; and a computer-readable medium coupled to the one or more computers having instructions stored thereon which, when executed by the one or more computers, cause the one or more computers to perform operations comprising:

selecting a plurality of candidate jobs to execute in a current job run, wherein the candidate jobs comprise pending jobs from a previous run that have not been completed due to an error condition and that are to be executed again, or new jobs in which execution has not yet been attempted, and wherein each candidate job performs an extracting, transforming or loading function for populating a database, storing, in a job status metadata table that stores information about each job's status when the previous run was completed in a STATUS field and that further stores information specifying a priority level for each job in a PRIORITY field, a new session identifier value in a SESSIONID field, selecting a subset of the candidate jobs to execute in the current run, selecting a first job of the subset to execute based on parent job-child job relationship information stored for the first job in a parent job metadata table, and further based on the priority level stored for the first job in the job status metadata table, determining that the first job does not actually exist within a particular repository or that the first job is not compiled, and based on determining that the first job does not exist within a particular repository or that the first job is not compiled, updating the STATUS field for the job in the job status metadata table to reflect that the job has not been completed due to an error condition, and halting execution of all remaining jobs in the subset.

9. The system of claim 8, wherein the operations further comprise determining the priority level for the first job from the PRIORITY field of the job status metadata table.

10. The system of claim 9, wherein selecting the first job comprises determining that the priority level for the first job has a highest priority level among multiple child jobs that have become eligible to execute in the current run based on a parent job successfully completing.

11. The system of claim 8 wherein the operations further comprise determining that two or more parent jobs of the first job have successfully completed.

12. The system of claim 11, wherein, in response to determining that the two or more parent jobs of the first job have successfully completed, selecting the first job further comprises determining, from the information stored for the first job in the parent job metadata table, that the first job is eligible to be executed.

13. The system of claim 8, wherein the operations further comprise determining, from one of the metadata tables, a quantity of candidate jobs to select in the subset.

14. The system of claim 13, wherein the operations further comprise selecting, as the subset, the determined quantity of candidate jobs.

15. A computer storage medium encoded with a computer program, the program comprising instructions that when executed by one or more computers cause the one or more computers to perform operations comprising:

selecting a plurality of candidate jobs to execute in a current job run, wherein the candidate jobs comprise pending jobs from a previous run that have not been completed due to an error condition and that are to be executed again, or new jobs in which execution has not yet been attempted, and wherein each candidate job performs an extracting, transforming or loading function for populating a database;

storing, in a job status metadata table that stores information about each job's status when the previous run was completed in a STATUS field and that further stores information specifying a priority level for each job in a PRIORITY field, a new session identifier value in a SESSIONID field;

selecting a subset of the candidate jobs to execute in the current run;

selecting a first job of the subset to execute based on parent job-child job relationship information stored for the first job in a parent job metadata table, and further based on the priority level stored for the first job in the job status metadata table;

determining that the first job does not actually exist within a particular repository or that the first job is not compiled; and based on determining that the first job does not exist within a particular repository or that the first job is not compiled, updating the STATUS field for the job in the job status metadata table to reflect that the job has not been completed due to an error condition, and halting execution of all remaining jobs in the subset.

16. The computer storage medium of claim 15, wherein the operations further comprise determining the priority level for the first job from the PRIORITY field of the job status metadata table.

17. The computer storage medium of claim 16, wherein selecting the first job comprises determining that the priority level for the first job has a highest priority level among multiple child jobs that have become eligible to execute in the current run based on a parent job successfully completing.

18. The computer storage medium of claim 15 wherein the operations further comprise determining that two or more parent jobs of the first job have successfully completed.

19. The computer storage medium of claim 18, wherein, in response to determining that the two or more parent jobs of the first job have successfully completed, selecting the first job further comprises determining, from the information stored for the first job in the parent job metadata table, that the first job is eligible to be executed.

20. The computer storage medium of claim 15, wherein the operations further comprise determining, from one of the metadata tables, a quantity of candidate jobs to select in the subset.

* * * * *

UNITED STATES PATENT AND TRADEMARK OFFICE
CERTIFICATE OF CORRECTION

PATENT NO. : 8,024,369 B2  
APPLICATION NO. : 12/057958  
DATED : September 20, 2011  
INVENTOR(S) : Paolo Pellegrini Page 1 of 1

It is certified that error appears in the above-identified patent and that said Letters Patent is hereby corrected as shown below:

Title page, column 1 (Title), item (54) line 2, delete "APPLICATION" and insert -- APPLICATIONS --, therefor.

Title page, column 2, item (56) line 5, under "OTHER PUBLICATIONS", delete "applicaton" and insert -- application --, therefor.

Column 1 (Title), line 2, delete "APPLICATION" and insert -- APPLICATIONS --, therefor.

Signed and Sealed this  
Third Day of April, 2012

David J. Kappos  
*Director of the United States Patent and Trademark Office*